(12) United States Patent
Wang et al.

(10) Patent No.: US 11,730,579 B2
(45) Date of Patent: Aug. 22, 2023

(54) VIBRATION STRUCTURE OF ELECTRICAL TOOTHBRUSH

(71) Applicant: JIASHAN D-MAX ELECTRONICS CO., LTD., Jiaxing (CN)

(72) Inventors: Wei-Chuan Wang, Jiaxing (CN); Qiang Wei, Jiaxing (CN)

(73) Assignee: JISHAN D-MAX ELECTRONICS CO., LTD., Jiaxing (CN)

( * ) Notice: Subject to any disclaimer, the term of this patent is extended or adjusted under 35 U.S.C. 154(b) by 329 days.

(21) Appl. No.: 16/824,715

(22) Filed: Mar. 20, 2020

(65) Prior Publication Data
US 2021/0235858 A1     Aug. 5, 2021

(30) Foreign Application Priority Data
Feb. 5, 2020   (TW) .................................. 109103570

(51) Int. Cl.
*A46B 13/02*    (2006.01)
*A61C 17/16*    (2006.01)
(Continued)

(52) U.S. Cl.
CPC ........ *A61C 17/3481* (2013.01); *A46B 13/023* (2013.01); *A46B 9/04* (2013.01); *A61C 17/16* (2013.01)

(58) Field of Classification Search
CPC ......... A46B 13/023; A46B 9/04; A61C 17/16; A61C 17/222; A61C 17/3481
See application file for complete search history.

(56) References Cited

U.S. PATENT DOCUMENTS

| | | | | |
|---|---|---|---|---|
| 6,140,723 A | * | 10/2000 | Matsui | B06B 1/045 |
| | | | | 15/22.4 |
| 2011/0041268 A1 | * | 2/2011 | Iwahori | A61C 17/16 |
| | | | | 15/22.1 |

(Continued)

FOREIGN PATENT DOCUMENTS

| CN | 108784872 A | 11/2018 |
|---|---|---|
| CN | 110368126 A | 10/2019 |

(Continued)

OTHER PUBLICATIONS

Eitel, Lisa, "Plain Bearings: What are they?", Jan. 22, 2015, https://www.bearingtips.com/plain-bearings/ (Year: 2015).*

(Continued)

*Primary Examiner* — Laura C Guidotti
(74) *Attorney, Agent, or Firm* — Demian K. Jackson; Jackson IPG PLLC

(57) ABSTRACT

A vibration structure of electrical toothbrush includes a shaft rod, a rocking rod, a fixing member and a vibration stem. The shaft rod has a first end and a second end. A driving power is applied to the first end to drive and vibrate the shaft rod. One end of the rocking rod is correspondingly inserted in the second end of the shaft rod. A weight block is disposed at the other end of the rocking rod. The weight block is eccentrically arranged to cause unbalance of the rocking rod to deflect from a central axis of the shaft rod. The fixing member is fitted on the rocking rod between the shaft rod and the weight block. The vibration stem is formed with an internal first space. The shaft rod is correspondingly disposed in the first space with the fixing member in contact with inner side of the vibration stem.

8 Claims, 11 Drawing Sheets

(51) Int. Cl.
*A61C 17/34* (2006.01)
*A46B 9/04* (2006.01)

(56) References Cited

U.S. PATENT DOCUMENTS

| | | | | |
|---|---|---|---|---|
| 2014/0137346 A1* | 5/2014 | Fattori | ............... | A61C 17/3481 15/22.1 |
| 2014/0150190 A1* | 6/2014 | Fattori | ............... | A61C 17/3481 15/22.1 |
| 2014/0259469 A1* | 9/2014 | Garrigues | .............. | A46B 13/02 15/22.1 |
| 2015/0020325 A1* | 1/2015 | Yoshida | ................. | A46B 7/042 15/22.1 |
| 2016/0022393 A1* | 1/2016 | Yoshida | ............... | A61C 17/221 15/22.1 |
| 2018/0177575 A1* | 6/2018 | Yoshida | ............... | A61C 17/221 |
| 2018/0193122 A1* | 7/2018 | Yoshida | ............. | A61C 17/3418 |
| 2019/0053614 A1* | 2/2019 | Kawabata | ............... | A61C 17/00 |
| 2019/0175320 A1* | 6/2019 | Bloch | ...................... | A46B 3/22 |

FOREIGN PATENT DOCUMENTS

| | | | | |
|---|---|---|---|---|
| CN | 209678737 U | | 11/2019 | |
| KR | 20180045657 A | * | 5/2018 | ............. A61C 17/34 |
| TW | 593828 U | | 4/2020 | |

OTHER PUBLICATIONS

Search Report dated Jul. 21, 2020 issued by Taiwan Intellectual Property Office for counterpart application No. 109103570.

* cited by examiner

VIBRATION STRUCTURE OF ELECTRICAL TOOTHBRUSH

This application claims the priority benefit of Taiwan patent application number 109103570 filed on Feb. 5, 2020.

BACKGROUND OF THE INVENTION

1. Field of the Invention

The present invention relates generally to a vibration structure, and more particularly to a vibration structure of electrical toothbrush, which can greatly prolong the useful life of the electrical toothbrush.

2. Description of the Related Art

The electrical toothbrush has the advantage that the electrical toothbrush is non-manually operable to mechanically vibrate and produce bubbles from the toothpaste so as to clean up a user's oral cavity. Please refer to FIGS. 1 and 2, which show the vibration structure 1 of a conventional electrical toothbrush. The conventional electrical toothbrush has a vibration stem 10. A shaft rod 11 is disposed in the internal space of the vibration stem 10. A rocking rod 12 is disposed at one end of the shaft rod 11. A weight block 13 is disposed at the front end of the rocking rod 12. The weight block 13 is eccentrically disposed to cause unbalance of the rocking rod 12 to deflect from a central axis 14 of the shaft rod 11.

However, due to the structural design of the conventional electrical toothbrush, the vibration amplitude of the weight block 13 is not large (poor vibration effect). Therefore, the deformation of the shaft rod 11 is increased so that when the shaft rod 11 swings, the shaft rod 11 will continuously hit and abrade the inner wall of the vibration stem 10 to make serious noise. This will seriously affect the function of the drive unit 15 to cause loss problem and instability of the electrical toothbrush. As a result, the useful life of the electrical toothbrush is shortened and it is troublesome to use the electrical toothbrush.

According to the above, the conventional electrical toothbrush has the following shortcomings:
1. The useful life of the conventional electrical toothbrush is shortened.
2. The conventional electrical toothbrush has serious noise problem.
3. The use stability of the conventional electrical toothbrush is poor.

It is therefore tried by the applicant to provide a vibration structure of electrical toothbrush to solve the above problem existing in the conventional electrical toothbrush.

SUMMARY OF THE INVENTION

It is therefore a primary object of the present invention to provide a vibration structure of electrical toothbrush, which can greatly prolong the useful life of the electrical toothbrush.

It is a further object of the present invention to provide the above vibration structure of electrical toothbrush, which can greatly lower noise. To achieve the above and other objects, the vibration structure of electrical toothbrush of the present invention includes a shaft rod, a rocking rod, a fixing member and a vibration stem. The shaft rod has a first end and a second end. A driving power is applied to the first end to drive and vibrate the shaft rod. One end of the rocking rod is correspondingly inserted in the second end of the shaft rod. A weight block is disposed at the other end of the rocking rod. The weight block is eccentrically arranged to cause unbalance of the rocking rod to deflect from a central axis of the shaft rod. The fixing member is fitted on the rocking rod between the shaft rod and the weight block. The vibration stem is formed with an internal first space. The shaft rod is correspondingly disposed in the first space with the fixing member in contact with inner side of the vibration stem.

According to the structural design of the present invention, the fixing member is disposed inside the vibration stem. An outer circumference of the fixing member is in contact with an inner wall of the vibration stem, whereby the fixing member is securely fixed in the first space of the vibration stem. Accordingly, the vibration amplitude of the weight block is enlarged and the vibration can be better transmitted. Therefore, the deformation of the shaft rod is reduced so that when rocking, the collision and abrasion of the shaft rod to the vibration stem are avoided and the noise problem caused by the abrasion is solved. Accordingly, the function loss problem of the drive unit due to the abrasion is reduced and the vibration effect is enhanced and the stability in use is increased so that the useful life of the electrical toothbrush is greatly prolonged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
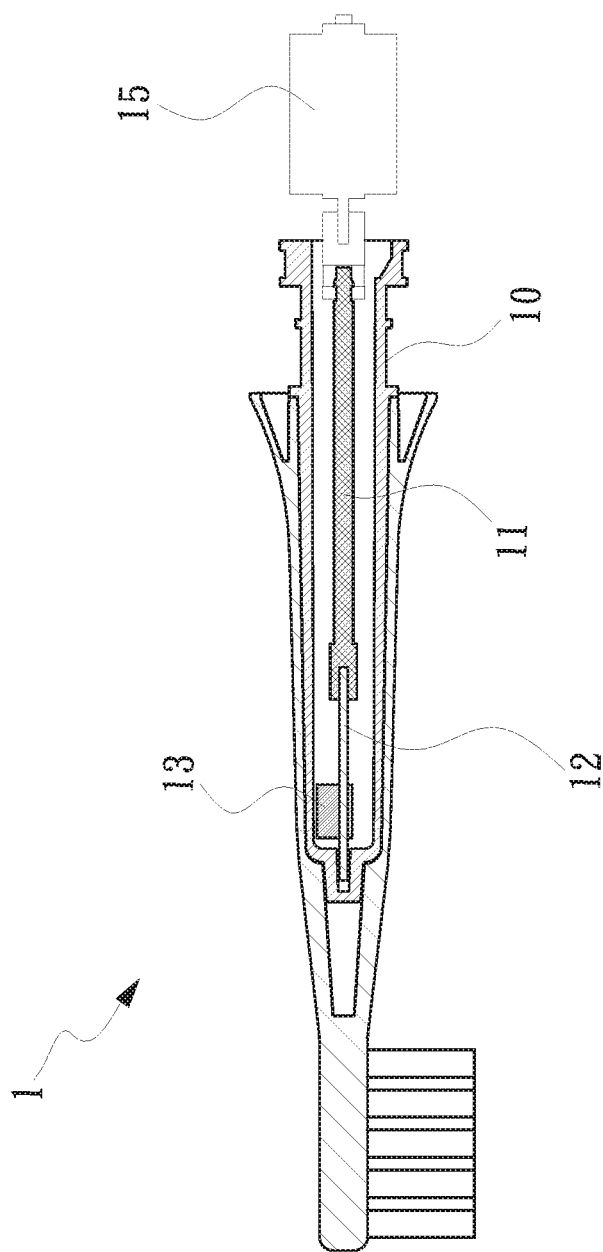
FIG. 1 is a sectional view of the vibration structure of a conventional electrical toothbrush.
Figure 2:
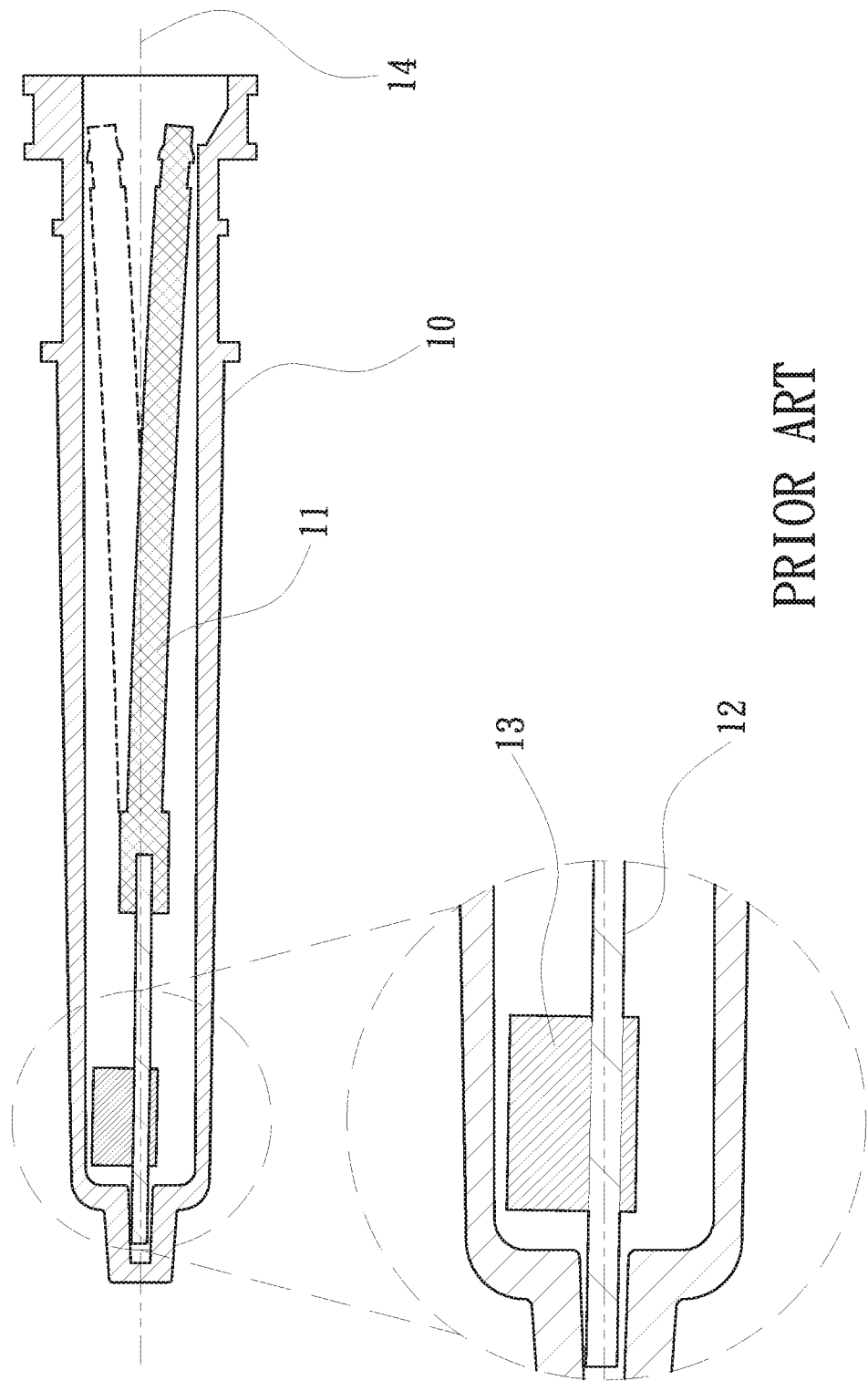
FIG. 2 is a sectional view of the vibration structure of the conventional electrical toothbrush, showing the application thereof.
Figure 3:
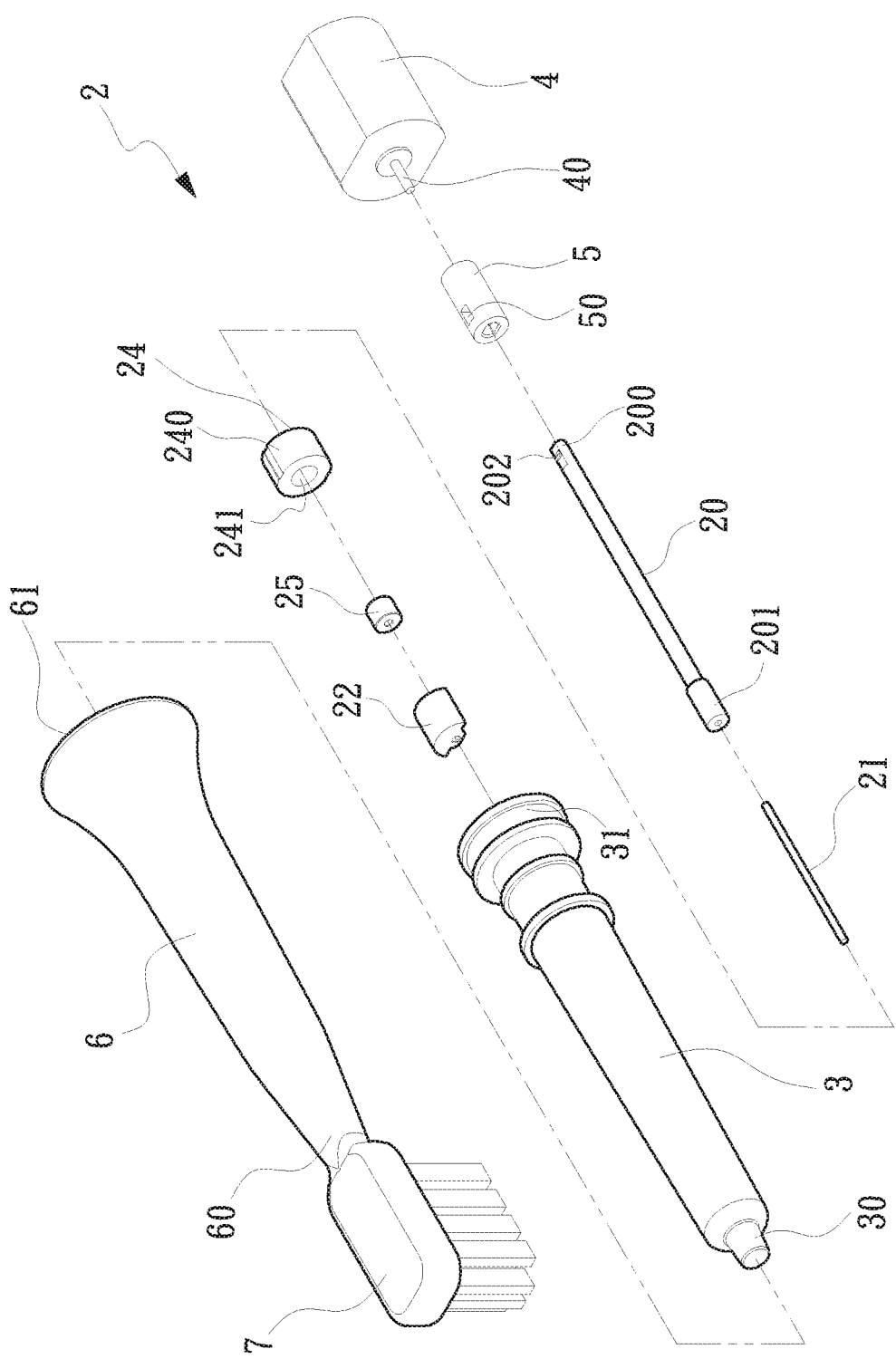
FIG. 3 is a perspective exploded view of a first embodiment of the vibration structure of electrical toothbrush of the present invention.
Figure 4:
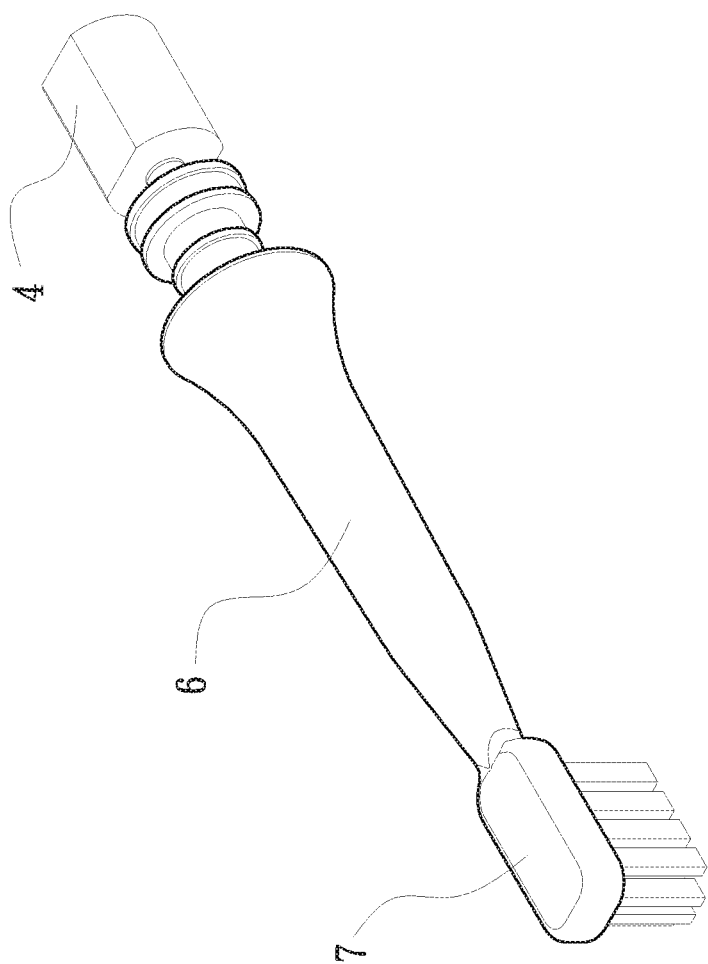
FIG. 4 is a perspective assembled view of the first embodiment of the vibration structure of electrical toothbrush of the present invention.
Figure 5:
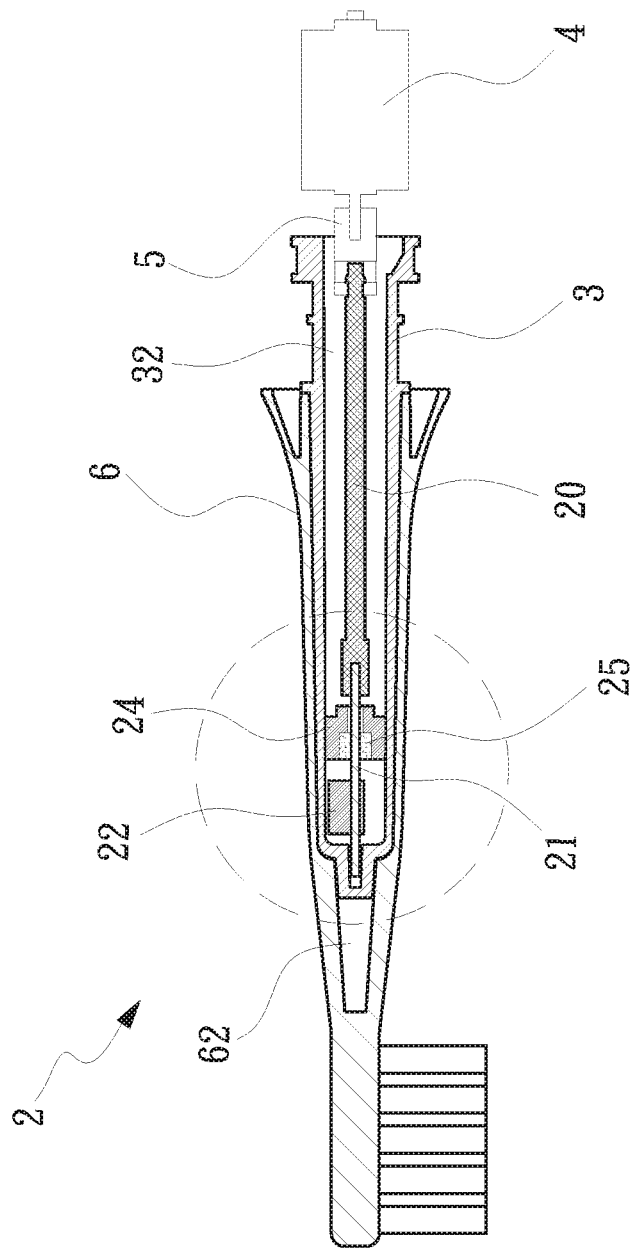
FIG. 5 is a sectional view of the first embodiment of the vibration structure of electrical toothbrush of the present invention.
Figure 6:
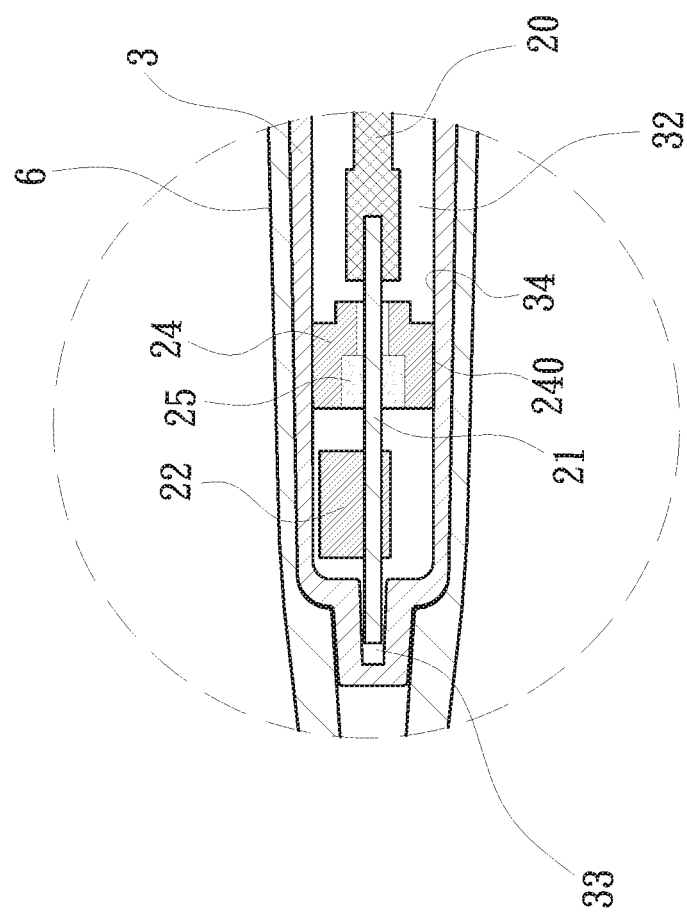
FIG. 6 is an enlarged view of circled area of FIG. 5.

Please refer to FIGS. 3 to 6. FIG. 3 is a perspective exploded view of a first embodiment of the vibration structure of electrical toothbrush of the present invention. FIG. 4 is a perspective assembled view of the first embodiment of the vibration structure of electrical toothbrush of the present invention. FIG. 5 is a sectional view of the first embodiment of the vibration structure of electrical toothbrush of the present invention. FIG. 6 is an enlarged view of circled area of FIG. 5. According to the first embodiment, the vibration structure 2 of electrical toothbrush of the present invention includes a shaft rod 20, a rocking rod 21, a fixing member 24 and a vibration stem 3. The shaft rod 20 has a first end 200 and a second end 201. A drive unit 4 is disposed at the first end 200. The drive unit 4 serves to generate and output a drive power to drive the shaft rod 20 to rotate.

One end of the rocking rod 21 is correspondingly disposed at the second end 201 of the shaft rod 20. The rocking rod 21 is, but not limited to, securely connected with the shaft rod 20 by means of engagement, press fit, adhesion, welding or integral forming. A weight block 22 is disposed at the other end of the rocking rod 21. The weight block 22 is eccentrically arranged to cause unbalance of the rocking rod 21 to deflect from a central axis 23 of the shaft rod 20. The rocking rod 21 is made of a high-wear-resistant and high-hardness material selected from a group consisting of stainless steel, metal, alloy or plastic material. The weight block 22 is made of a material selected from a group consisting of copper, tungsten steel, metal or nonmetal material.

The fixing member 24 is correspondingly fitted on the rocking rod 21 between the shaft rod 20 and the weight block 22. The fixing member 24 is, but not limited to, secured on the rocking rod 21 also by means of engagement, press fit, adhesion or welding. In addition, the fixing member 24 is formed with an internal receiving space 241. A fixing block 25 is correspondingly received in the receiving space 241. The rocking rod 21 is correspondingly passed through the fixing block 25. In this embodiment, the fixing member 24 and the fixing block 25 are selectively two independent components. The fixing member 24 and the fixing block 25 are, but not limited to, made of a material selected from a group consisting of copper, copper/iron alloy, metal material, polyoxymethylene, thermoplastic material and any combination thereof. In a modified embodiment, the fixing member 24 and the fixing block 25 can be integrally formed.

Please further refer to FIG. 6. The vibration stem 3 has a first closed end 30 and a first open end 31. The first closed end 30 and the first open end 31 together define a first space 32. In addition, the vibration stem 3 is formed with an inner wall 34. The fixing member 24 has an outer circumference 240. The shaft rod 20 is correspondingly disposed in the first space 32 with the outer circumference 240 of the fixing member 24 in contact with the inner wall 34 of the vibration stem 3, whereby the fixing member 24 is fixed in the first space 32 of the vibration stem 3. Moreover, a second space 33 is formed at the first closed end 30 in communication with the first space 32. The other end of the rocking rod 21 is correspondingly engaged in the second space 33.

In addition, a drive shaft 40 protrudes from one end of the drive unit 4. A link unit 5 is correspondingly disposed between the drive unit 4 and the shaft rod 20. One end of the link unit 5 is connected with the drive shaft 40. The other end of the link unit 5 is recessed to form an engagement hole 50. The first end 200 of the shaft rod 20 is formed with an engagement section 202 raised from the outer circumference of the first end 200. The engagement section 202 is correspondingly engaged in the engagement hole 50, whereby when rotating, the link unit 5 is prevented from loosening to separate from the shaft rod 20. Therefore, the structural strength is greatly enhanced. The link unit 5 can be made of polyoxymethylene or thermoplastic material by means of injection molding.

Figure 7:
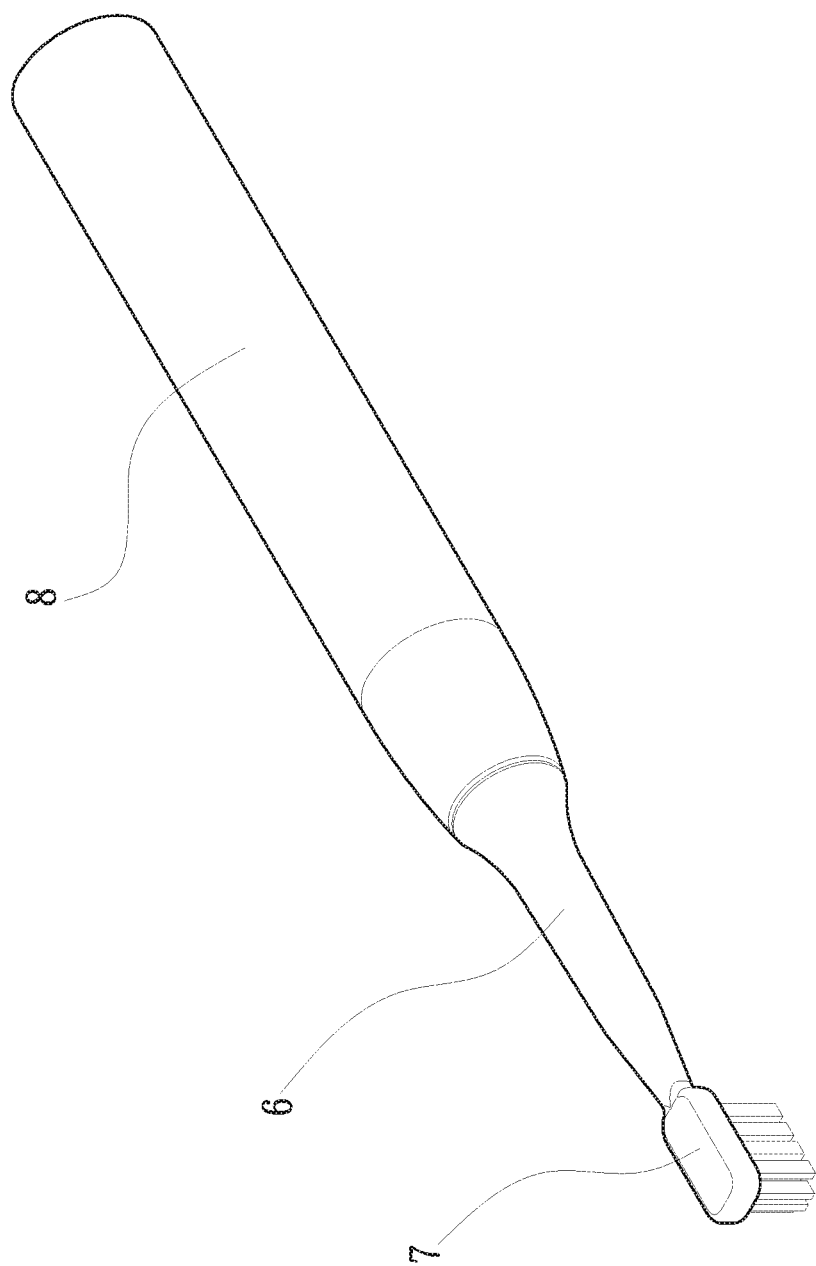
FIG. 7 is a perspective assembled view of the first embodiment of the electrical toothbrush of the present invention.

Please now refer to FIG. 7. The vibration structure 2 of electrical toothbrush of the present invention further includes a cleaning fitting head 6 and a main body section 8. The cleaning fitting head 6 has a second closed end 60 and a second open end 61. The second closed end 60 and the second open end 61 together define a receiving space 62. A brush head 7 is disposed on outer side of the second closed end 60. The brush head 7 is fitted around the vibration stem 3 via the receiving space 62. The main body section 8 is correspondingly connected with the cleaning fitting head 6 for a user to hold. The drive unit 4 is received in the main body section 8.

Figure 8:
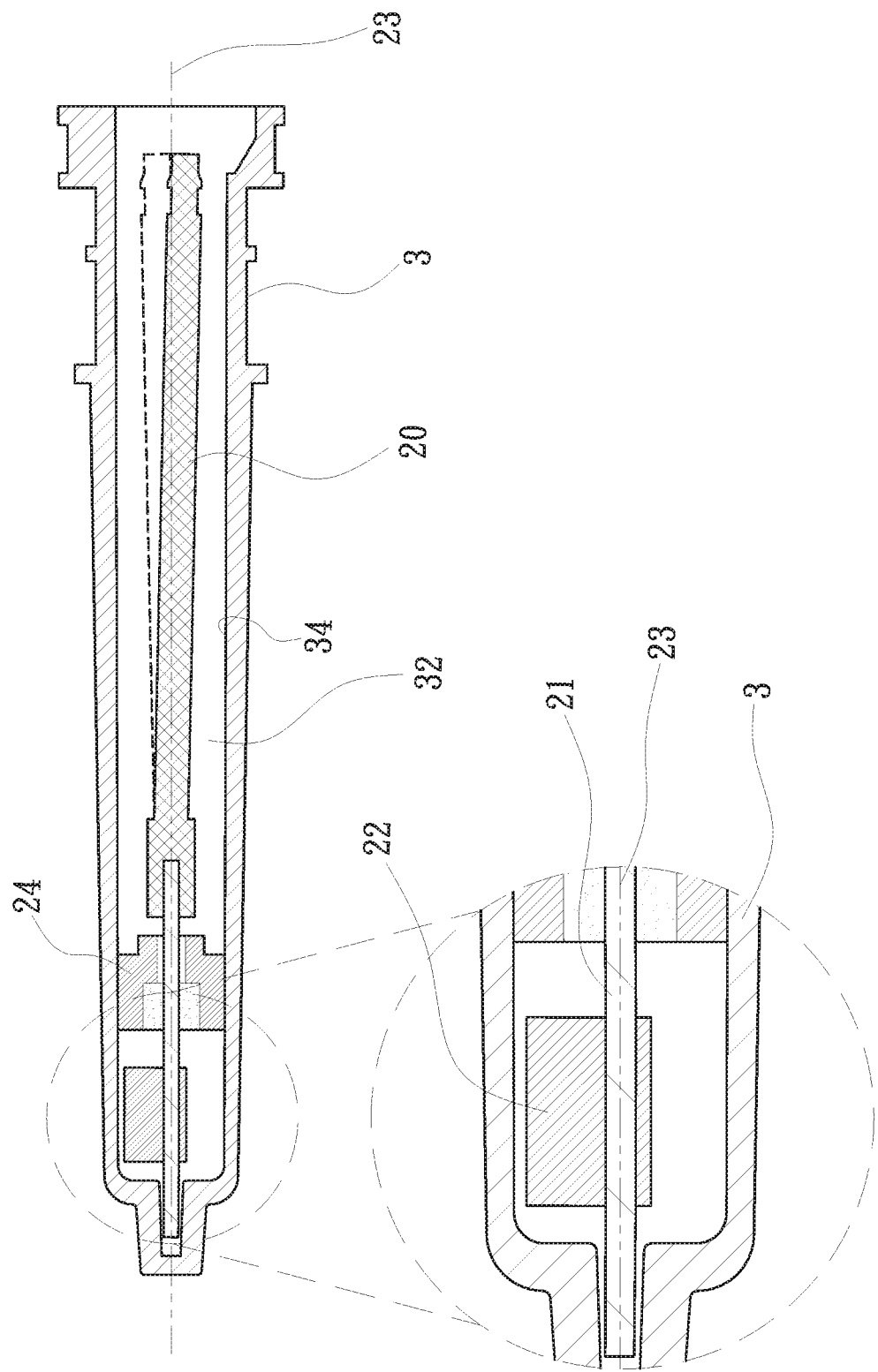
FIG. 8 is a sectional view of the first embodiment of the vibration structure of electrical toothbrush of the present invention, showing the application thereof.

Please now refer to FIG. 8. According to the structural design of the present invention, the fixing member 24 is disposed in the first space 32 of the vibration stem 3. The outer circumference 240 of the fixing member 24 is in contact with the inner wall 34 of the vibration stem 3, whereby the fixing member 24 is fixed in the first space 32 of the vibration stem 3. Accordingly, when the driving power is applied to the first end 200 of the shaft rod 20 and the shaft rod 20 is driven to vibrate, the driving power is transmitted to the rocking rod 21. By means of the secured fixing member, the vibration amplitude of the weight block 22 is enlarged to enhance the stability of the vibration. Therefore, the deformation of the shaft rod 20 is reduced so that when rocking, the collision and abrasion of the shaft rod 20 to the vibration stem 3 are avoided and the noise problem caused by the abrasion is solved. Accordingly, the function loss problem of the drive unit 4 due to the abrasion is reduced so that the useful life of the electrical toothbrush is greatly prolonged.

Figure 9:
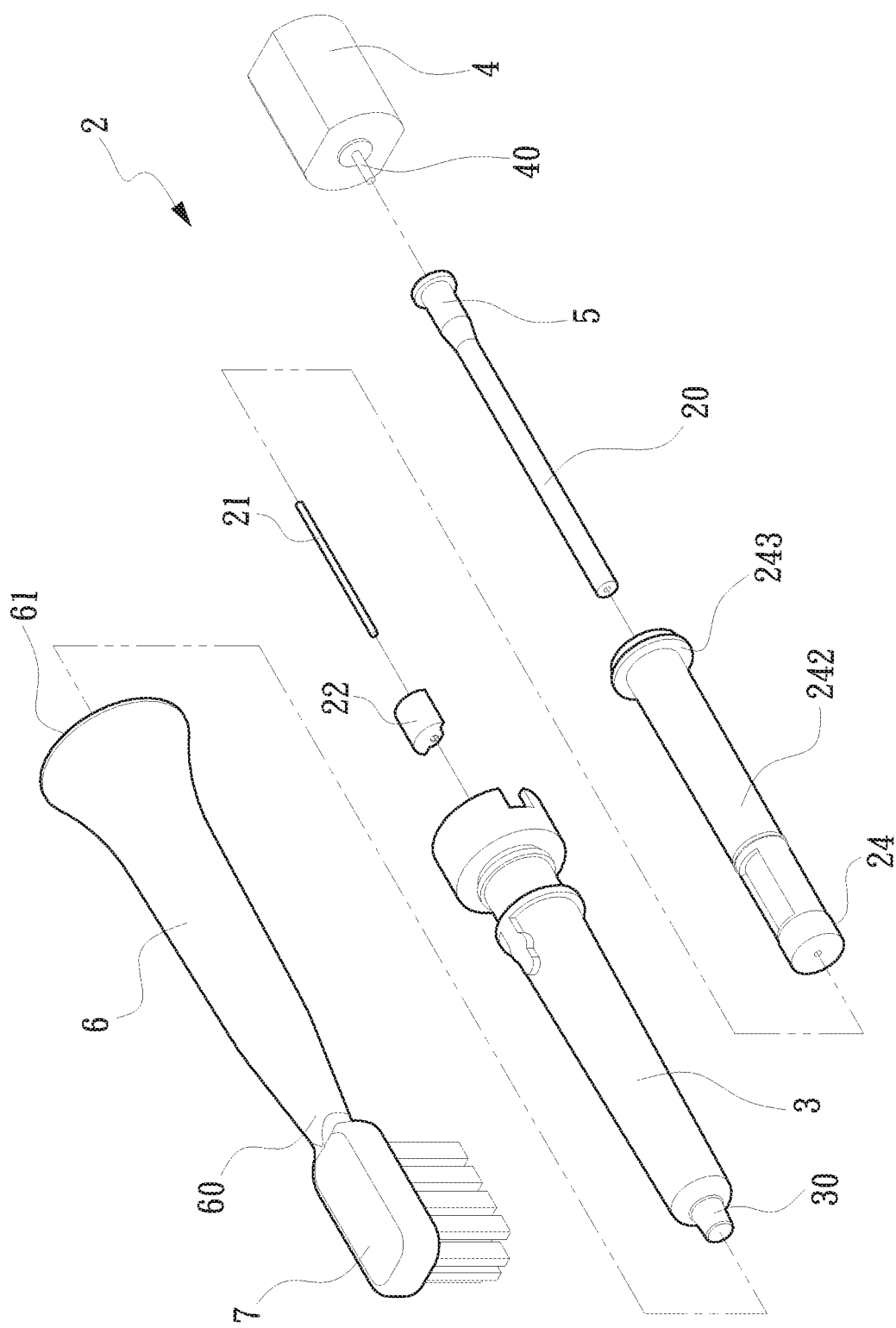
FIG. 9 is a perspective exploded view of a second embodiment of the vibration structure of electrical toothbrush of the present invention.
Figure 10:
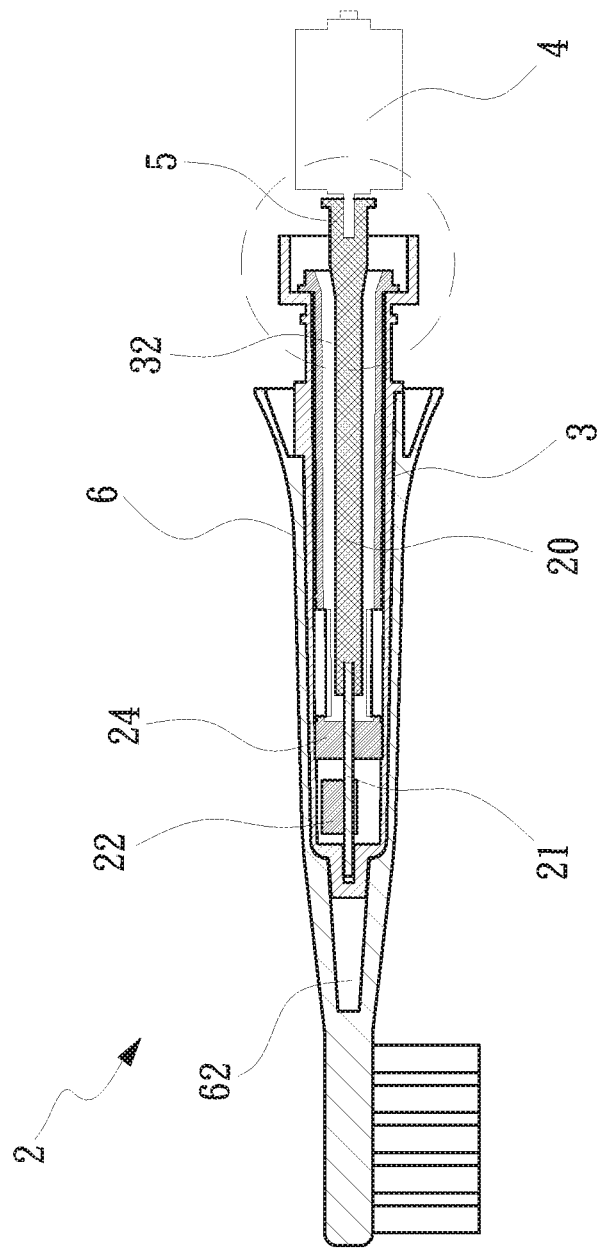
FIG. 10 is a sectional view of the second embodiment of the vibration structure of electrical toothbrush of the present invention.
Figure 11:
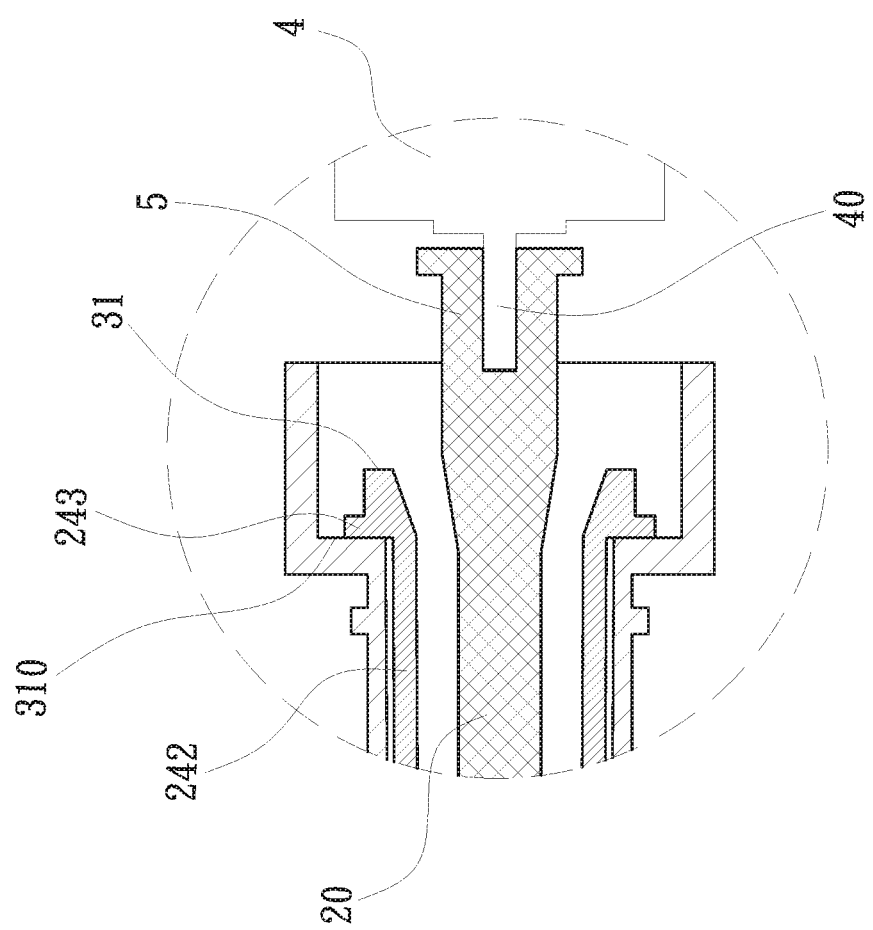
FIG. 11 is an enlarged view of circled area of FIG. 10.

Please further refer to FIGS. 9, 10 and 11. FIG. 9 is a perspective exploded view of a second embodiment of the vibration structure of electrical toothbrush of the present invention. FIG. 10 is a sectional view of the second embodiment of the vibration structure of electrical toothbrush of the present invention. FIG. 11 is an enlarged view of circled area of FIG. 10. The second embodiment of the vibration structure of electrical toothbrush of the present invention is different from the first embodiment of the vibration structure of electrical toothbrush of the present invention in that the link unit 5 and the shaft rod 20 is integrally formed. One end of the fixing member 24 further extends to the shaft rod 20 to form an extension section 242. The extension section 242 and the fixing member are integrally formed in an elongated cylindrical structural configuration for easy installation. In addition, a flange 243 is annularly disposed on the outer circumference of the rear end of the extension section 242. An engagement section 310 is further formed at the first open end 31 of the vibration stem 3. The flange 243 is correspondingly engaged on the engagement section 310. Therefore, when shaft rod 20 rocks, the collision and abrasion of the shaft rod 20 to the vibration stem 3 are reduced so that the useful life of the electrical toothbrush is greatly prolonged.

In conclusion, in comparison with the conventional vibration structure of electrical toothbrush, the vibration structure of electrical toothbrush of the present invention has the following advantages:

1. The useful life of the electrical toothbrush is greatly prolonged.
2. The noise is greatly reduced.
3. The stability in use is better.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A vibration structure of electrical toothbrush comprising:
   a vibration stem having a closed end, an open end, a first space defined between the closed end and the open end, and a second space formed at the closed end and in communication with the first space;
   a shaft rod disposed in the first space and having a first end and a second end, a driving power being applied to the first end to drive and vibrate the shaft rod;
   a rocking rod, one end of the rocking rod being connected to the second end of the shaft rod and an opposite end of the rocking rod being engaged in the second space of the vibration stem with the rocking rod arranged coaxially with the shaft rod;
   a weight block disposed eccentrically on the rocking rod to cause unbalance of the rocking rod to deflect from a central axis of the shaft rod;
   a fixing member correspondingly fitted on the rocking rod between the shaft rod and the weight block with an outer circumference of the fixing member fixed in contact with an inner wall of the vibration stem in the internal first space and wherein the fixing member is further formed with a receiving space; and
   a fixing block received in the receiving space, wherein the rocking rod extends through the fixing block so as to isolate the shaft rod from collision and abrasion with the vibration stem and such that a vibration amplitude of the weight block is increased, stability of vibration is enhanced, and deformation of the shaft rod is reduced.

2. The vibration structure of electrical toothbrush as claimed in claim 1, further comprising a drive unit connected with the first end of the shaft rod, the drive unit serving to output the driving power.

3. The vibration structure of electrical toothbrush as claimed in claim 2, wherein a drive shaft protrudes from one end of the drive unit, a link unit being correspondingly disposed between the drive unit and the shaft rod, one end of the link unit being connected with the drive shaft, the other end of the link unit being connected with the first end of the shaft rod.

4. The vibration structure of electrical toothbrush as claimed in claim 3, wherein the link unit is recessed to form an engagement hole, the first end of the shaft rod being formed with an engagement section raised from an outer circumference of the first end, the engagement section being correspondingly engaged in the engagement hole.

5. The vibration structure of electrical toothbrush as claimed in claim 3, wherein the link unit and the shaft rod are integrally formed.

6. The vibration structure of electrical toothbrush as claimed in claim 1, wherein the rocking rod is securely connected with the shaft rod by means of engagement, press fit, adhesion, welding or integral forming.

7. The vibration structure of electrical toothbrush as claimed in claim 1, wherein the fixing member and the fixing block are made of a material selected from a group consisting of copper, copper/iron alloy, metal material, polyoxymethylene, thermoplastic material, and any combination thereof.

8. The vibration structure of electrical toothbrush as claimed in claim 1, wherein the rocking rod is made of stainless steel or metal material and the weight block is made of a material selected from a group consisting of copper, tungsten steel, metal or nonmetal material.

\* \* \* \* \*